T. CONROY.
HOOF PAD.
APPLICATION FILED OCT. 18, 1912.
1,057,222.
Patented Mar. 25, 1913.
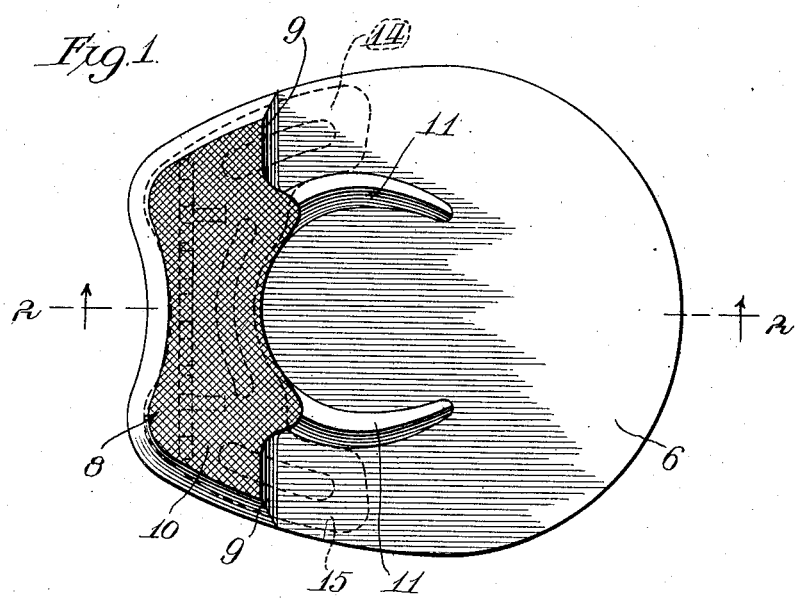
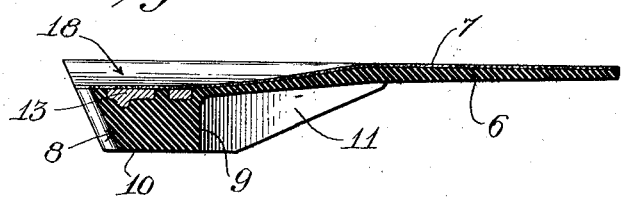
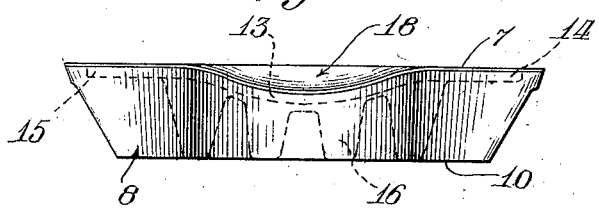
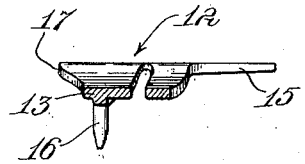
Witnesses:
Harry S. Gaither
Thomas A. Banning
Inventor:
Thomas Conroy
by Banning & Banning
Atty's

UNITED STATES PATENT OFFICE.

THOMAS CONROY, OF CHICAGO, ILLINOIS.

HOOF-PAD.

1,057,222.

Specification of Letters Patent.  Patented Mar. 25, 1913.

Application filed October 18, 1912. Serial No. 726,536.

*To all whom it may concern:*

Be it known that I, THOMAS CONROY, a citizen of the United States, residing at Chicago, in the county of Cook and State of Illinois, have invented certain new and useful Improvements in Hoof-Pads, of which the following is a specification.

The present invention relates to that form of hoof pad which is provided with a relatively thin portion intended to seat between the horse shoe and the hoof, and which is provided with a cross piece or heel in the rear portion which heel is intended to extend down into immediate contact with the pavement.

More particularly the invention relates to a pad of the above class in which use is made of a reinforcing plate or bar.

A number of pads of the above described class have been devised but, as a rule, no provision has been made for improving the grip between the downwardly extending heel portion and the pavement. So that the gripping efficiency or traction has depended almost wholly upon the ability of the rubber or other yielding material of the pad to grip the pavement. I am familiar with certain forms of pad in which metal prongs have been provided, the intention being in such cases that these prongs, by extending through to the lower surface of the pad material, shall directly engage the pavement. However, in all such pads with which I am familiar these prongs have been formed and supported entirely separate from the reinforcing plate itself, so that the weight or force exerted upon them has had to be transmitted from the horse's hoof through the rubber or other yielding material of the pad to the prongs. For this reason these prongs, as heretofore used, have not been very effective for gripping purposes.

One of the main objects of the present invention is to directly connect or associate a row or set of teeth with the reinforcing plate so that the forces will be directly transmitted from said plate to the teeth, which latter will not be dependent for their effectiveness upon the yielding material of the body of the pad.

One of the main objections to all previous forms of hoof pads with which I am familiar has been the fact that the pressure from the horse's hoof has not been distributed in a proper manner and on the proper portions of the surface of the hoof. The horny or bony matter of the hoof lies in the form of a crescent, of which the ends are at the rear of the hoof, the width of such matter varying but, as a rule, not exceeding more than about a half an inch. Extending forward from the rear ends of this crescent-shaped portion are two members which join together at approximately the middle of the hoof and constitute what is known as the frog. Above this frog lies the navicular bone.

Another object of the present invention is to so construct the hoof pad that all of that portion immediately beneath and adjacent to the frog shall be clear and unobstructed, thereby removing all possibility of exerting a pressure on the frog. Nevertheless the present hoof pad is so constructed that the reinforcing plate shall be firmly gripped and caused to transmit a suitable portion of the load directly to the pavement, so as not to impair the gripping effectiveness of the teeth.

Another object of the present invention is to so shape the reinforcing plate that the same can be made from a minimum of material without in any way detracting from its effectiveness to accomplish the above mentioned results, thus reducing the weight of the pad.

Other objects and uses will appear from a detailed description of the invention, which consists in the features of construction and combination of parts hereinafter described and claimed.

Referring to the drawing,—Figure 1 shows a bottom plan view of the completed pad with reinforcing plate shown in dotted lines; Fig. 2 is a section taken on the line 2—2 of Fig. 1, looking in the direction of the arrows; Fig. 3 is a back view of the complete pad showing the reinforcing plate and teeth by means of dotted lines; Fig. 4 is a back view of the reinforcing plate removed from the pad; and Fig. 5 is a section taken on the line 5—5 of Fig. 4, looking in the direction of the arrows.

In the several figures the main portion 6 of the pad is of relatively thin material, preferably having its upper surface faced with a layer of canvas or the like, 7.

The main portion of the pad follows in shape the general outline of the horse's hoof. At its rear portion the pad is provided with a downwardly projecting heel member 8, which extends entirely across the pad and has its forward edges 9 so placed as to lie immediately behind the ends of the horse shoe. The depth of this heel is such that its lower surface 10 will come firmly into contact with the pavement when the horse shoe is in place. A pair of reinforcing webs 11 extend forwardly from the heel to the thin or body portion and serve to reinforce the connection between the parts.

A reinforcing member or plate 12 is completely embedded in the material of the pad. It has its central portion 13 arched downwardly while its side portions are flat and are extended forwardly to provide the arms 14 and 15. These arms project a sufficient distance into the thin or body portion of the pad to be firmly gripped between the hoof and the rear ends of the horse shoe when the horse stands on the hoof in question. A row of separated teeth 16 is formed across the reinforcing plate, said teeth extending down to the lower surface of the heel, so that when the horse exerts a pressure on the hoof a suitable portion of the load will be transmitted directly through the teeth to the pavement.

The side portions of the reinforcing plate are substantially flat from the forward edges of the arms 14 and 15 to the rear edge 17 of the plate. The plate is preferably embedded in the material of the pad, with its upper surface immediately adjacent the upper surface of said material. The canvas layer is then placed over the upper surface of the plate, so that the latter will lie immediately beneath said layer. On account of the fact that the side portions of the plate are substantially flat from front to rear, it follows that when the pad and horse shoe are secured to the hoof the downward pressure from the rear portion of the crescent-shaped, bony member of the hoof will be transmitted directly to the sides of the reinforcing plate along a line on each side of the hoof from the front of the corresponding arm to the rear edge 17 of the plate. In this way a very considerable portion of the total load on the hoof will be passed directly to the plate, so that a large pressure will be exerted on the teeth 16 for gripping purposes. Nevertheless, by arching the central portion of the plate downwardly, as shown particularly in Figs. 3 and 4, so that a concave space or section 18 will be provided in the rear and central portion of the pad, none of the pressure will be exerted on the frog of the hoof, so that all danger of thus injuring the hoof will be eliminated.

For the purpose of securing a firm union or connection between all portions of the material from which the pad is made, I prefer to completely separate the teeth as shown in Figs. 3 and 4, and to provide perforations in the arms 14 and 15 and a perforation in the arched portion 13, as shown particularly in Figs. 1 and 5. By constructing the pad in this manner all portions of it will be firmly joined together during the vulcanizing process, with the result that the quality of the product will be greatly improved.

While I have shown a pad in which the depression 18 extends forwardly substantially to the middle of the pad and across from the arm 14 to the arm 15, still it is evident that any other shape or size of depression might be adopted according to the requirements, it being desired, however, that the depression in each case should be such as to remove the possibility of exerting any pressure upon the frog of the hoof, and that the upper faces of the sides of the plate should be caused to receive a downward pressure from the greatest possible portion of the crescent-shaped, bony matter of the hoof.

I wish particularly to point out the fact that by means of the herein described construction I have accomplished the two results of firmly gripping the reinforcing plate and causing same to transmit a desired percentage of the load directly through the teeth to the pavement, and that at the same time I have removed all possibility of creating a pressure on the frog of the horse's hoof. These results follow directly from the provision of the depression 13 in the reinforcing plate in combination with the provision of the flat portions at the sides of the said depression. These flat portions are of sufficient length and area to support a considerable length of the rear end of each side of the crescent-shaped, bony matter of the horse's hoof, so that a very considerable percentage of the total weight on the hoof is carried by the reinforcing plate. Nevertheless the yielding substance of the heel proper will carry such a percentage of the load as to bring it effectively into play.

I claim:

1. In a hoof pad, the combination of a relatively thin body portion, a downwardly extending heel across the rear end of the same, a reinforcing plate completely embedded in the material of the heel and of the body portion and having a row of downwardly extending teeth adapted to come directly in contact with the pavement, the central part of said reinforcing plate being depressed with respect to the upper surface of the body portion to provide a depression beneath the frog of a horse's hoof and the sides of the reinforcing plate being substantially flat and of equal elevation with the body portion for the purpose of directly sustaining the rear ends of the sides of the hoof whereby a portion of the load on the hoof is transmitted directly through the teeth of the reinforcing plate to the pavement.

2. In a hoof pad, the combination of a body portion of relatively thin material, a downwardly extending heel across the rear end of the same, and a reinforcing plate completely embedded in the heel and in the body portion, said plate having its central part depressed with respect to the body portion to provide a depression beneath the frog of the horse's hoof and the sides of said plate being substantially flat and of equal elevation with the body portion to directly sustain a portion of the load on the rear ends of the sides of the hoof, and the side portions of the plate extending forwardly with respect to the heel to occupy positions between the hoof and the rear ends of the horse shoe whereby said forwardly extending portions are gripped between the horse shoe and the hoof and a plurality of teeth secured to said plate and extending downwardly in the heel to directly contact the pavement, substantially as described.

3. In a hoof pad, the combination of a relatively thin body portion, a downwardly extending heel across the rear end of the same, a reinforcing plate embedded in the material of the heel and of the body portion and having a row of downwardly extending teeth adapted to come directly into contact with the pavement, the central part of said reinforcing plate being depressed with respect to the upper surface of the body portion to provide a depression beneath the frog of a horse's hoof, said depression extending rearwardly from the center of the pad to the rear edge thereof, and the sides of the reinforcing plate being substantially flat and of equal elevation with the body portion for the purpose of directly sustaining the rear ends of the sides of the hoof, whereby a portion of the load on the hoof is transmitted directly through the teeth of the reinforcing plate to the pavement, substantially as described.

4. In a hoof pad, the combination of a relatively thin body portion, a downwardly extending heel across the rear end of the same, a reinforcing plate embedded in the material of the heel and of the body portion and having a downwardly extending member adapted to come directly into contact with the pavement, the central part of the reinforcing plate being depressed with respect to the upper surface of the body portion to provide a depression beneath the frog of a horse's hoof, said depression extending rearwardly from the center of the pad to the rear edge thereof, and the sides of the reinforcing plate being substantially flat and of equal elevation with the body portion for the purpose of directly sustaining the rear ends of the sides of the hoof, whereby a portion of the load on the hoof is transmitted directly through the downwardly extending member of the reinforcing plate to the pavement, substantially as described.

THOMAS CONROY.

Witnesses:
  THOMAS A. BANNING, Jr.,
  WM. P. BOND.

---

Copies of this patent may be obtained for five cents each, by addressing the "Commissioner of Patents, Washington, D. C."